United States Patent [19]

Schwark

[11] Patent Number: 5,464,918

[45] Date of Patent: * Nov. 7, 1995

[54] PEROXIDE-SUBSTITUTED POLYSILAZANES

[75] Inventor: Joanne M. Schwark, Wilmington, Del.

[73] Assignee: Lanxide Technology Company, LP, Newark, Del.

[ * ] Notice: The portion of the term of this patent subsequent to Sep. 6, 2011, has been disclaimed.

[21] Appl. No.: 298,017

[22] Filed: Aug. 30, 1994

Related U.S. Application Data

[63] Continuation of Ser. No. 17,888, Feb. 16, 1993, Pat. No. 5,344,907, which is a continuation-in-part of Ser. No. 772,394, Oct. 7, 1991, abandoned.

[51] Int. Cl.$^6$ .................................................. C08G 77/06
[52] U.S. Cl. ........................ 528/24; 528/25; 528/33; 528/38; 524/443; 525/474
[58] Field of Search ................. 524/443; 528/24, 528/25, 33, 38; 525/474

[56] References Cited

U.S. PATENT DOCUMENTS

| | | | |
|---|---|---|---|
| 3,700,712 | 10/1972 | Ostrozynski | 260/448.2 |
| 3,843,703 | 10/1974 | Ostrozynski | 260/448.2 |
| 4,482,669 | 11/1984 | Seyferth et al. | 528/28 |
| 4,722,988 | 2/1988 | Porte et al. | 528/28 |
| 4,772,494 | 9/1988 | Porte et al. | 427/374.7 |
| 4,929,704 | 5/1990 | Schwark | 525/474 |
| 5,021,533 | 6/1991 | Schwark | 528/21 |
| 5,344,907 | 9/1994 | Schwark | 528/33 |

OTHER PUBLICATIONS

Kazakova, V. V. et al., Chemical Properties of Organooligocyclosilazanes, Poly. Sci. USSR, vol. 26, No. 8, pp. 1889–1897 (1984).

*Primary Examiner*—Melvyn I. Marquis
*Attorney, Agent, or Firm*—Carol A. Lewis

[57] ABSTRACT

An uncrosslinked polysilazane containing chemically bound peroxide groups is prepared by reacting a polysilazane and a hydroperoxide at a temperature below the decomposition temperature of the hydroperoxide. A thermoset polymer is formed by heating an uncrosslinked, peroxide-substituted silazane that is also substituted by alkenyl or alkynyl groups at temperatures sufficiently high to decompose the chemically bound peroxide groups to yield a free radical, thereby initiating crosslinking. The crosslinked polysilazanes can be pyrolyzed to form ceramic articles.

11 Claims, No Drawings

PEROXIDE-SUBSTITUTED POLYSILAZANES

This is a continuation of application Ser. No. 08/017,888 filed on Feb. 16, 1993, which issued on Sept. 6, 1994, as U.S. Pat. No. 5,344,907, which was a continuation-in-part of U.S. Ser. No. 07/772,394, filed on Oct. 7, 1991, and now abandoned.

FIELD OF THE INVENTION

The present invention relates to the preparation of polysilazanes. Specifically, the present invention is directed to the preparation of uncrosslinked, peroxide-substituted polysilazanes and a method for producing a crosslinked silazane polymer. Related to this, the present invention is also directed to polysilazanes including a chemically bound free radical generator and thermosettable polysilazanes. The present invention is also directed to a process for producing a shaped article and a method of producing a ceramic article which uses a polysilazane including a chemically bound free radical generator as well as shaped articles, ceramic mixtures, and ceramic articles that have been prepared using uncrosslinked polysilazanes including a chemically bound free radical generator.

BACKGROUND OF THE INVENTION

The crosslinking of silicon-based polymers with organic peroxides is known. In particular, siloxanes have been cured by heating in the presence of an appropriate peroxide. However, little has been reported about the peroxide-crosslinking of polysilazanes.

In 1984, Kazakova et al. found that organooligocyclosilazanes, prepared by the catalytic condensation of a variety of cyclosilazanes, could be crosslinked by heating with 0.5–2.5 wt % of the silyl peroxide $(MeSiOO^tBuO)_x$. The peroxide cure was particularly effective for silazanes with vinyl groups—up to 63% of a methylvinyloligocyclosilazane could be crosslinked by heating to 220° C. Several polysilazane precursor systems have used this chemistry to produce high char yield solids.

U.S. Pat. No. 3,700,712, R. L. OSTROZYNSKI, discloses a process for preparing a silicon peroxide compound by reacting a dimethylamino silicon compound with a hydroperoxide compound.

U.S. Pat. No. 3,843,703, R. L. OSTROZYNSKI, teaches a process for preparing a silicon peroxide compound, which is not a polysilazane, by reacting a silazane compound with more than one molar equivalent of a hydroperoxide compound per equivalent of nitrogen in the silazane.

U.S. Pat. No. 4,772,494, H. PORTE et al., teaches a method of spinning fibers and coating using an organopolysilazane composition that can be crosslinked by an energy input. The organopolysilazane composition comprises an organopolysilazane and a free radical generator in an amount effective to crosslink the organopolysilazane.

U.S. Pat. No. 4,722,988, H. PORTE et al., discloses an organopolysilazane composition that can be crosslinked by an energy input. The organopolysilazane composition comprises an organopolysilazane and a free radical generator in an amount effective to crosslink the organopolysilazane.

U.S. Pat. No. 5,021,533, J. M. SCHWARK, discloses crosslinkable poly(thio)ureasilazane compositions comprising a poly(thio)ureasilazane and a free radical generator in an amount effective to crosslink the poly(thio)ureasilazane.

In U.S. Pat. Nos. 4,772,494, 4,772,988 and 5,021,533, the organopolysilazane is not a self-thermosetting polymer. In these patents, the peroxide must be mixed into the polymer before it can be thermoset.

U.S. Pat. Nos. 3,700,712 and 3,843,703 both produce silyl peroxides ending with alkyl or aryl substituents on silicon peroxide groups. During the silyl peroxide synthesis, the amine groups are lost as free amine and no ammonium halide salt is formed.

SUMMARY OF THE INVENTION

The present invention is based on the discovery that, as an alternative to admixing a peroxide with a polysilazane for thermoset applications, the peroxide can be incorporated into the uncrosslinked polymer structure in accordance with the process of the present invention wherein the hydroperoxide reacts at a silicon nitrogen bond in the polymer to directly attach the peroxide to the polymer backbone. In accordance with the present invention, the majority of the silicon nitrogen bonds are maintained in the polymer structure, making it a suitable preceramic polymer. Also, in the present invention the curing agent is distributed throughout the polymer on the molecular level. Such a peroxide-substituted, uncrosslinked polysilazane has several advantages over systems in which the peroxide is simply mixed with, but not reacted onto, the polysilazane. Since the peroxide is attached to the backbone of the uncrosslinked polymer, segregation of the peroxide upon storage cannot occur. In addition, the curing agent is distributed throughout the polymer on a molecular level. This is particularly advantageous for solid polysilazanes, since it is difficult to obtain a homogeneous distribution of a peroxide in such polymers.

The present invention, therefore, relates to the preparation of novel peroxide-substituted, uncrosslinked polysilazanes which contain a free radical generator that is bound to the backbone of the polymer. Upon heating, the free radical generators, i.e., the peroxide groups, undergo decomposition producing free radicals that act to initiate crosslinking of suitable functional groups, e.g., vinyl groups, in the polysilazane.

The peroxide-substituted, uncrosslinked polysilazane of the present invention is prepared by the reaction of a hydroperoxide, ROOH, with a polysilazane. The hydroperoxide reacts with a silicon-nitrogen (Si—N) bond in the polymer, producing a silyl peroxide bound to the backbone of the polymer.

More specifically, the present invention is directed to a process for the preparation of a peroxide-substituted, uncrosslinked polysilazane that involves reacting a silazane selected from the group consisting of ammonolysis products of halosilanes, mixtures of halosilanes, polymeric silazanes and oligomeric silazanes, with a hydroperoxide, under conditions and for a time effective to produce a reaction product comprising a peroxide-substituted, uncrosslinked polysilazane having a chemically bound peroxide, preferably wherein the hydroperoxide is t-butyl hydroperoxide. For purposes of the present invention, the hydroperoxide can be present in levels within the range of about 0.01 to about 10.0% by weight of the silazane, and preferably within the range of about 0.03 to about 1.0%.

The peroxide-substituted, uncrosslinked polysilazanes of the present invention have the advantage of extended storage properties because the peroxide does not separate from the polymer upon standing. This non-separating property is due to the fact that the peroxide is attached to the backbone of the polymer.

The polymers of the present invention can be used as precursors to monolithic ceramic bodies or as binders in conventional ceramic fabrication processes such as dry pressing, isostatic pressing, slip casting, tape casting, extrusion and injection molding. Solid or liquid precursors can be used for purposes of the present invention.

In addition, the curing agent in the present invention is distributed throughout the polymer on a molecular level. The molecular level distribution is particularly advantageous for solid polysilazanes, since it is difficult to obtain a homogeneous distribution of a peroxide in such polymers. In addition, the polymers of the present invention can be used to form coatings, foams, infiltrate preform structures, or as fiber precursors.

For purposes of the present invention the silazane may be selected from the group consisting of polymeric silazanes and oligomeric silazanes, and preferably is selected from a group consisting of alkenyl-substituted silazanes, and alkynyl-substituted silazanes.

In accordance with the present invention, the reaction temperature is less than the decomposition temperature of the hydroperoxide, and is preferably within the range of about −78° C. to about 30° C.

The present invention is also directed to a peroxide-substituted, uncrosslinked polysilazane produced by the processes described above, preferably wherein the peroxide has the general formula ROOH, wherein R is selected from the group consisting of H, substituted 1–10 carbon alkyl groups, unsubstituted 1–10 carbon alkyl groups, aryl groups, 2–10 carbon alkenyl groups, 2–10 carbon alkynyl groups, a carboxylic acid, and a silyl group.

The present invention is also directed to a method of forming a thermoset polymer, which involves heating an uncrosslinked polysilazane comprising functional groups selected from the group consisting of alkenyl groups and alkynyl groups and which additionally comprises a chemically bound peroxide at temperatures sufficiently high to decompose the chemically bound peroxide to yield a free radical, thereby initiating crosslinking reactions of the functional groups to thermoset the polymer.

The present invention is also directed to a thermoset polysilazane comprising substantially crosslinked functional groups selected from the group consisting of alkenyl groups and alkynyl groups.

The present invention is also directed to a method of producing a ceramic article from a ceramic precursor comprising a peroxide-substituted polysilazane.

The present invention is also directed to a ceramic mixture that comprises a powder selected from the group consisting of ceramic powders and metal powders, and a binder comprising a peroxide-substituted, uncrosslinked polysilazane.

DETAILED DESCRIPTION OF THE INVENTION

The present invention is directed to the preparation of a peroxide-substituted, uncrosslinked polysilazane with free radical generators, i.e., the peroxide groups, bound to the backbone of the polymer. Upon heating, the free radical generator decomposes to produce oxygen-centered free radicals that initiate the crosslinking of suitable functional groups e.g., vinyl groups, in the polymer. A crosslinked polysilazane polymer is thus produced that can be a solid or a liquid.

In accordance with the present invention, the peroxide-substituted, uncrosslinked polysilazane is readily prepared by the reaction of a silazane polymer or oligomer with less than one molar equivalent of a hydroperoxide per equivalent of the nitrogen contained in the polysilazane. As used herein, hydroperoxide is meant to include compounds with the structural formula ROOH in which R is selected from the group consisting of H, substituted or unsubstituted 1–10 carbon alkyl, 2–10 carbon alkenyl, 2–10 carbon alkynyl, aryl, a carboxylic acid, and a silyl group. The hydroperoxide, ROOH, reacts with the silazane at a Si—N bond to form a silyl peroxide Si—OOR moiety, attached to the uncrosslinked polymer or oligomer Si—N backbone through a Si atom.

The preferred polysilazanes for use in the present invention can be prepared by reacting ammonia, or a mixture of ammonia and a substituted or unsubstituted 1–4 carbon alkyl or aryl amine, with a halogenated silicon compound selected from the group consisting of $RSiX_3$, $RR'SiX_2$ and mixtures thereof, including mixtures where more than one compound having the formula $RSiX_3$ or $RR'SiX_2$ is used. Optionally, $RR'R''SiX$, $SiX_4$ or mixtures thereof can also be present in the reaction mixture. X can be Cl, Br or I; however, Cl is preferred. R, R', R'' can be the same or different and are selected from the group consisting of H, substituted or unsubstituted 1–6 carbon alkyl, aryl, 2–6 carbon alkenyl and 2–6 carbon alkynyl groups.

Preferably, the reaction mixture also contains at least one halogenated silicon compound having an alkenyl or alkynyl group. Examples of halogenated silicon compounds suitable for use in the process of this invention include, but are not limited to, methyldichlorosilane, vinylmethyldichlorosilane, tetrachlorosilane, tetrabromosilane, trichlorosilane, vinyltrichlorosilane, methyltrichlorosilane, phenyltrichlorosilane, ethyltrichlorosilane, propyltrichlorosilane, butyltrichlorosilane, methyltribromosilane, dimethyldichlorosilane, phenylmethyldichlorosilane, dimethyldibromosilane, trimethylchloro-silane, dimethylchlorosilane, dimethylvinylchlorosilane, and trimethylbromosilane.

As used herein the term "polysilazane" is meant to include any polysilazane or modified polysilazane, such as the isocyanate-modified polysilazanes disclosed in U.S. Pat. No. 4,929,704, the disclosure of which is incorporated by reference in its entirety. Preferably, such polysilazanes include alkenyl or alkynyl groups. The silazanes can be liquids or solids, provided they are miscible with the hydroperoxide or soluble in a solvent compatible with the hydroperoxide.

Hydroperoxides containing at least one ROOH functional group can be used. Suitable hydroperoxides include, but are not limited to, hydrogen peroxide, methyl hydroperoxide, ethyl hydroperoxide, propyl hydroperoxide, isopropyl hydroperoxide, n-butyl hydroperoxide, dimethylbenzyl hydroperoxide, t-butyl hydroperoxide, n-octyl hydroperoxide, 2,4-dihydroperoxy-2,4-dimethylpentane, 2,5-dihydroperoxy-2,5-dimethylhexane, cumyl hydroperoxide, p-chlorocumyl hydroperoxide, allyl hydroperoxide, 1,1,2-trimethylallyl hydroperoxide, 1,1-dimethylprop-2-ynyl hydroperoxide, peroxyacetic acid, diperoxyterephthalic acid, peroxybenzoic acid, p-methylperoxybenzoic acid, triphenylsilyl hydroperoxide, tribenzylsilyl hydroperoxide, and diphenylmethyl hydroperoxide. Hydroperoxide levels of from 0.01–10.0 wt % (based on the total weight of the polysilazane/hydroperoxide mixture) can be used. The preferred hydroperoxide range is 0.01–5.0 wt %. The more preferred hydroperoxide range is from 0.01–2.0 wt %. The most preferred hydroperoxide range is from 0.03–1.0 wt. %.

When the polysilazanes are made from halogenated silicon compounds containing alkenyl or alkynyl groups, the uncrosslinked, peroxide-substituted polysilazane contains the groups ≡mSiOOR and ≡SiR³ where R is as described above in the formula for the hydroperoxide and R³ is a 2–10 carbon alkenyl or alkynyl group. Preferably R is a t-butyl group and R³ is a vinyl group.

The following explanation is given to provide a better understanding of the present invention:

Hydroperoxides are compounds with the general formula ROOH, and like alcohols and carboxylic acids, are reactive, protic compounds. Such compounds react with a silazane at an Si—N bond to produce Si—OOR and N—H groups. Pike and Shaffer (*Chemistry and Industry*, 1957, p1294) showed that silyl peroxides could be prepared by the reaction of a silylamine with a hydroperoxide (Eq. 1).

$$Me_3SiNHR + {}^tBuOOH \rightarrow Me_3SiOO^tBu + RHN_2 \quad (1)$$

It has been discovered that when a polysilazane is used in place of a silylamine, the reaction produces a peroxide group bound to the uncrosslinked polymer backbone, provided that less than one molar equivalent of the hydroperoxide per equivalent of nitrogen in the polysilazane is used. For polysilazanes containing a plurality of NH groups, ammonia is also a by-product of the reaction. For example, when a cyclic polysilazane of the formula $(R_2SiNH)_x$ is reacted with a hydroperoxide, a ring-opening reaction occurs at a Si—N bond to place a silyl peroxide end group on the Si and form an $NH_2$ group (Eq.2).

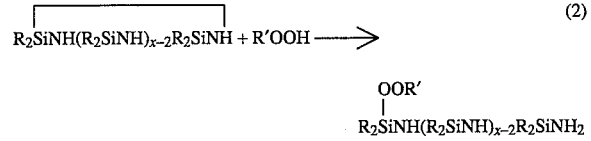

The $SiNH_2$ group can remain in the uncrosslinked peroxide-substituted polysilazane if the substituents on the Si atom are bulky e.g., ethyl or t-butyl. When the substituents on the Si atom are not bulky, e.g., hydrogen or methyl, several additional reactions can occur at this site (Scheme 1). While not wishing to be bound by any particular theory, self-condensation of two Si—$NH_2$ groups could occur to produce ammonia and a longer chain, uncrosslinked polysilazane (Path A). Alternatively, the Si-$NH_2$ group might react with another equivalent of hydroperoxide to produce ammonia and another Si—OOR' group (Path B). It is believed that Path B is often the preferred mode of reaction because the Si—$NH_2$ group created in the initial ring-opening reaction with the hydroperoxide is the most reactive Si—N bond in the reaction mixture.

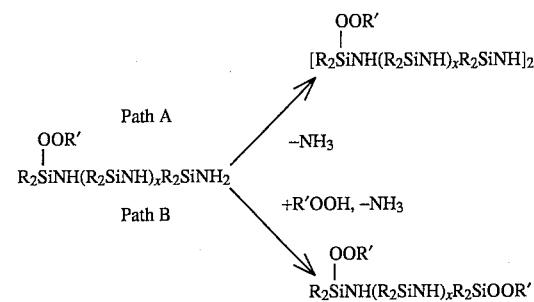

Both Path A and Path B produce peroxide-substituted, uncrosslinked polysilazanes which, if they contain alkenyl or alkynyl substituents, are crosslinked when heated to temperatures at which the silyl peroxide undergoes poly(m-ethylvinyl)silazane, $[(MeSiHNH)_{0.8}(MeSiCH=CH_2NH)_{0.2}]_x$, decomposition. For example, a liquid was reacted with 5 mol % t-butyl hydroperoxide under conditions detailed in Example 1 to produce a liquid peroxide-substituted, uncrosslinked polysilazane. A sample of the peroxide-substituted, uncrosslinked polysilazane was thermoset by heating in an oil bath. At a bath temperature of 124° C., an exotherm to 203.7° C. was observed and a hard, solid, crosslinked silazane polymer product was obtained. The decomposition temperature was further substantiated using differential scanning calorimetry (DSC) which showed an onset of exotherm at 117.7° C. and a peak heat evolution at 155° C. The heat of reaction of the peroxide-substituted polysilazane during cure was 105 cal/g.

Much lower levels of peroxide substitution are sufficient to prepare a peroxide-substituted, uncrosslinked polysilazane and are described in Example 2.

The reaction of the polysilazane with the hydroperoxide can be carried out over a wide range of conditions and temperatures, provided the reaction mixture is not heated to a temperature at which the hydroperoxide decomposes. The reaction temperature range is from about –78° C. to about 175° C. The more preferred reaction temperature range is from about –78° C. to about 30° C. The most preferred reaction temperature range is from about 0° C. to about 30° C. The reaction temperature that is most suitable depends upon the relative reactivity and decomposition temperature of the specific hydroperoxide that is used and can be readily determined by one skilled in the art. The maximum reaction temperature should not exceed the decomposition temperature of the hydroperoxide.

The reaction is preferably conducted using a solvent, such as pentane, hexane, heptane, octane, benzene and toluene, although any solvent compatible with the hydroperoxide can be used. Optionally, the reaction can be conducted without a solvent if the polysilazane is a liquid.

The peroxide-substituted, uncrosslinked polysilazanes prepared by the process of the present invention can be liquids or solids. Although not wishing to be bound by any particular theory, upon heating, it is believed that the peroxide moiety will undergo decomposition to give peroxide radicals that initiate crosslinking reactions to produce a crosslinked silazane polymer. Preferably, when the peroxide-substituted, uncrosslinked polysilazane contains alkenyl or alkynyl groups, the crosslinking reaction produces a thermoset, crosslinked silazane polymer. The crosslinking reaction is conducted at a temperature at which a significant fraction of the peroxide has decomposed to form radical species. This temperature will depend upon the particular peroxide moiety that is bound to the uncrosslinked polysilazane backbone and can be readily determined by one skilled in the art. Thus, a liquid silazane can be thermoset to a solid. A solid polysilazane can also be thermoset so that it will not melt upon heating.

The peroxide-substituted, uncrosslinked polysilazanes of the present invention can be used as precursors to monolithic ceramic articles. In addition, the polysilazanes of the present invention can be used as binders.

The polysilazanes of the present invention can contain ceramic or metal fillers. Suitable fillers include, for example, SiC, $Si_3N_4$, $SiO_2$, BN, AlN, $Al_2O_3$, TiN, TiC, Si, Ti, Zr, Hf, ZrC, and $B_4C$ in the form of powders, whiskers or platelets.

The filled or unfilled, peroxide-substituted, uncrosslinked polysilazanes can be shaped by processes including, but not limited to, dry pressing, isostatic pressing, extrusion, and injection molding, which are well known to one skilled in the art.

The shaped body can be thermoset by heating using conventional treatment parameters.

A ceramic article can then be produced by pyrolysis and sintering of the shaped, thermoset article in a non-reactive atmosphere such as argon, helium, hydrogen, and the like or in a reactive atmosphere, such as ammonia.

The following non-limiting examples were conducted to further illustrate the present invention.

All reactions were performed in an argon-filled dry box or under nitrogen using standard inert atmosphere techniques. $^t$BuOOH was obtained from Aldrich as a 3.0M solution in isooctane and used as received. Hexane was dried using 3Å and 13X Linde molecular sieves. The poly(methylvinyl)silazane, $[(MeSiHNH)_{0.8}(MeSiCH=CH_2NH)_{0.2}]_x$, was prepared by standard ammonolysis procedures such as those described in U.S. Pat. No. 4,929,704, the disclosure of which is incorporated in its entirety by reference, and used without further purification.

Thermogravimetric analyses (TGA) were performed at 20° C./min from 25°–1000° C. in nitrogen. Differential scanning calorimetry (DSC) was performed at 10° C./min under nitrogen from 40°–320° C.

EXAMPLE 1

Reaction of Poly(methylvinyl)silazane with 5 mol % $^t$BuOOH for Thermal Characterization A 50 ml, two-necked, round-bottomed flask was oven-dried and equipped with a stir bar and septum, and sparged with nitrogen. The flask was charged with 5.00 g (77.7 mmol) of a liquid poly(methylvinyl)silazane, $[(MeSiHNH)_{0.8}(MeSiViNH)_{0.2}]_x$, and 10.0 ml hexane by syringe. A 3.0M solution of $^t$BuOOH (1.30 ml, 3.89 mmol) in isooctane was added dropwise by syringe over 10 minutes. An exotherm from 24.7° C. to 29.7° C. occurred and gas evolution was observed. The gas was basic when tested with pH paper. The reaction mixture was stirred for an additional 30 minutes at 25° C. Gas evolution was still evident, so the reaction mixture was stirred overnight (16 hours) at 25° C. The hexane was removed in vacuo to give an uncrosslinked, peroxide-substituted polysilazane as a colorless oil.

DSC (10° C./min, 40°–320° C.): Heat of reaction, 105.4 cal/g; Peak decomposition temperature, 155.3° C.

A 17 ml vial equipped with a septum and thermocouple was sparged with nitrogen and charged with a 1 ml sample of the uncrosslinked, peroxide-substituted polysilazane by syringe. The sample was placed in a room temperature oil bath and slowly heated. When the oil bath temperature was 124° C., the reaction mixture exothermed to 203.7° C. and thermoset to a hard solid. Gas evolution was visible and the mixture foamed slightly.

TGA (20° C./min, 25°–1000° C.): 75.9 wt %.

EXAMPLE 2

Reaction of Poly(methylvinyl)silazane with $^t$BuOOH

A 50 ml, three-necked, round-bottomed flask was oven-dried, equipped with a stir bar and septum, and sparged with nitrogen. The flask was charged with 20 ml hexane and 10.0 g (155.4 mmol) of poly(methylvinyl)silazane, $[(MeSiHNH)_{0.8}(MeSiViNH)_{0.2}]_x$. The appropriate amount, shown below, of a 3.0M solution of $^t$BuOOH in isooctane was added by syringe. Each reaction was started at 21.5° C. The maximum temperature reached during the hydroperoxide addition is listed below:

1) 12 μl (0.036 mmol, 0.032 wt %); Max. temperature (T)=21.5° C.

2) 60 μl (0.18 mmol, 0.16 wt %); Max. T=21.9° C.

3) 120 μl (0.36 mmol, 0.032 wt %); Max. T=21.9° C.

4) 600 μl (1.80 mmol, 1.62 wt %); Max. T=23.9° C.

For purposes of this data, Wt. % is based on the weight of the polysilazane.

Gas evolution was observed in each reaction. The reaction mixtures were stirred for 1.5 hours until the gas evolution had ceased. The hexane was removed in vacuo to give the uncrosslinked, peroxide-substituted polysilazane as a clear oil in quantitative yield.

Each polysilazane was thermoset using the following procedure. A 17 ml vial equipped with a septum and thermocouple was sparged with nitrogen and charged with a 1 ml sample of the uncrosslinked, peroxide-substituted polysilazane by syringe. The sample was placed in a preheated 160° C. oil bath. As soon as the sample was placed in the bath, a timer was started and the timer was stopped when the maximum exotherm temperature was reached. Each polysilazane thermoset to a solid. The exotherm temperature attained, the time to reach this temperature, and the TGA yield of each thermoset product is presented in Tables 1 and 2.

TABLE 1

| | Peroxide-substituted Polysilazane TGA Yields and Quantity Initiator Used | | |
|---|---|---|---|
| Radical Generator | Generator Level (wt. %) | Maximum Temp. (°C.) | TGA Yield (Wt. %) |
| $^t$BuOOH | 0.032 | 216.8 | 70.07 |
| | 0.16 | 206.4 | 75.1 |
| | 0.32 | 209.7 | 73.4 |
| | 1.60 | 241.2 | 75.2 |

TABLE 2

| | Cure Time and Initiator Level Peroxide-substituted Polysilazane | | |
|---|---|---|---|
| Radical Generator | Generator Level (wt. %) | Cure Time (Minutes) | Maximum Temp. °C. |
| $^t$BuOOH | 0.032 | 6.55 | 216.8 |

TABLE 2-continued

| | Cure Time and Initiator Level Peroxide-substituted Polysilazane | | |
|---|---|---|---|
| Radical Generator | Generator Level (wt. %) | Cure Time (Minutes) | Maximum Temp. °C. |
| | 0.16 | 4.63 | 206.4 |
| | 0.32 | 5.15 | 209.7 |
| | 1.60 | 2.50 | 241.2 |

EXAMPLE 3

An uncrosslinked, peroxide-modified polysilazane was prepared by the method described in Example 2. A 250 ml Schlenk flask was equipped with a stir bar and a septum and sparged with nitrogen. The flask was charged with poly(methylvinyl)silazane (50.0 g) and 100 ml hexane by syringe. The hydroperoxide (0.60 ml of a 3.0M solution of t-butyl hydroperoxide in isooctane) was added dropwise via a syringe over 5 min. Gas evolution was observed. The reaction mixture was stirred for 1.5 hours and then the hexane was removed in vacuo to give an uncrosslinked, peroxide-substituted polysilazane as a clear oil in quantitative yield.

A 10.0 g sample of the uncrosslinked, peroxide-substituted polysilazane was mixed, by hand, with 14.22 g of a Starck Grade S silicon nitride powder. The fluid mix was poured into a test tube which was then placed in a 160° C. oil bath. The sample was thermoset and then cooled to room temperature. The thermoset, solid plug was removed from the test tube mold and retained the shape and surface finish of the mold. The piece could not be broken by hand. The thermoset green body was then pyrolyzed under argon from room temperature to 700° C. at 0.5° C./min and from 700° C. to 1200° C. at 10° C./min. After cooling to room temperature, a black fired ceramic article having the same surface finish and shape as the mold was obtained.

Likewise, a 6.89 g sample of the uncrosslinked, peroxide-substituted polysilazane was mixed, by hand, with 10.00 g of a Starck B 10 beta silicon carbide powder. The fluid mix was poured into a test tube which was then placed in a 160° C. oil bath. The sample was thermoset and then cooled to room temperature. The thermoset, solid plug was removed from the test tube mold and retained the shape and surface finish of the mold.

EXAMPLE 4

A 10.00 g sample of the uncrosslinked, peroxide-substituted polysilazane of Example 3 was placed in a nitrogen-sparged 1 oz. jar capped with a septum. The jar was placed in a 160° C. oil bath and the sample was thermoset. After cooling to room temperature, the sample was broken into chunks and placed in a graphite boat in a tube furnace under argon and heated from room temperature to 1600° C. at 10° C./min. The sample was held at 1600° C. for 6 hours and then cooled to room temperature. A black ceramic material was obtained in 52.7 wt % yield. The ceramic was not a powder; chunks present in the unfired sample were maintained in the fired sample.

Although the invention has been described with reference to particular means, materials and embodiments, from the foregoing, one skilled in the art can easily ascertain the essential characteristics of the present invention; and various changes and modifications can be made to various usages and conditions without departing from the spirit and scope of the invention as described in the claims that follow.

What is claimed is:

1. A process for the preparation of an uncrosslinked, peroxide-substituted polysilazane, said process comprising reacting a polysilazane with less than one molar equivalent per equivalent of nitrogen in the polysilazane of a hydroperoxide having the formula ROOH where R is H, substituted or unsubstituted 1–10 carbon alkyl, 2–10 carbon alkenyl, 2–10 carbon alkynyl, aryl, a carboxylic acid group or a silyl group, at a temperature below the decomposition temperature of the hydroperoxide to produce an uncrosslinked polysilazane substituted with chemically bound peroxide groups.

2. The process of claim 1 wherein R is a 1–10 carbon alkyl group.

3. The process of claim 2 wherein R is a t-butyl group.

4. The process of claim 1 wherein the hydroperoxide is present at levels within the range of about 0.01 to about 10.0% by weight of said silazane, provided less than one molar equivalent of hydroperoxide per equivalent of nitrogen in the polysilazane is used.

5. The process of claim 4 wherein the levels of hydroperoxide are within the range of about 0.03 to about 1.0%.

6. The process of claim 1 wherein the silazane is also substituted with at least one 2–10 carbon alkenyl or alkynyl group.

7. The process of claim 6 wherein the silazane is substituted with the alkenyl group.

8. The process of claim 7 wherein the alkenyl group is a vinyl group.

9. The process of claim 1 wherein the temperature is within the range of about −78° C. to about 30° C.

10. The process of claim 1 wherein the reacting is performed in the presence of a solvent.

11. An uncrosslinked, peroxide-substituted polysilazane produced by the process of claim 1.

* * * * *